(12) United States Patent
Kim

(10) Patent No.: US 10,988,021 B2
(45) Date of Patent: Apr. 27, 2021

(54) IN-WHEEL MOTOR POWERTRAIN

(71) Applicant: HYUNDAI TRANSYS INCORPORATED, Seosan-si (KR)

(72) Inventor: Sang Kook Kim, Ansan-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 16/695,425

(22) Filed: Nov. 26, 2019

(65) Prior Publication Data
US 2020/0207204 A1 Jul. 2, 2020

(30) Foreign Application Priority Data

Dec. 27, 2018 (KR) .................. 10-2018-0170327

(51) Int. Cl.
| | |
|---|---|
| *B60K 17/04* | (2006.01) |
| *F16H 37/04* | (2006.01) |
| *F16H 57/02* | (2012.01) |
| *B60K 7/00* | (2006.01) |
| *F16H 57/04* | (2010.01) |
| *B60B 35/12* | (2006.01) |

(52) U.S. Cl.
CPC .......... *B60K 17/046* (2013.01); *B60B 35/125* (2013.01); *B60K 7/0007* (2013.01); *F16H 37/041* (2013.01); *F16H 57/02* (2013.01); *F16H 57/0441* (2013.01); *F16H 57/0486* (2013.01); *F16H 57/0495* (2013.01); *B60K 2007/0061* (2013.01); *F16H 2057/02034* (2013.01); *F16H 2057/02052* (2013.01); *F16H 2702/02* (2013.01)

(58) Field of Classification Search
CPC ............... B60K 17/046; B60K 7/0007; B60K 2007/0061; B60K 2007/0038; F16H 37/041; F16H 57/02; F16H 57/0441; F16H 57/0495; F16H 57/0486; F16H 2057/02034; F16H 2702/02; F16H 2057/02052; F16H 1/20; H02K 7/006; H02K 7/116; B60B 35/125
See application file for complete search history.

(56) References Cited

U.S. PATENT DOCUMENTS 9,550,414 B2 * 1/2017 Kudo .................. B60B 27/0052

FOREIGN PATENT DOCUMENTS

| KR | 10-2014-0081351 | | 7/2014 | |
|---|---|---|---|---|
| WO | WO-2007010843 A1 | * | 1/2007 | ............. H02K 7/085 |
| WO | WO-2017026258 A1 | * | 2/2017 | ............. H02K 7/116 |

* cited by examiner

*Primary Examiner* — Justin Holmes
(74) *Attorney, Agent, or Firm* — Novick, Kim & Lee, PLLC; Jae Youn Kim; Jihun Kim

(57) ABSTRACT

An in-wheel motor powertrain includes an input gear directly connected to a motor; an output gear disposed parallel to the input gear; an intermediate gear integrally and concentrically provided with a first gear meshed with the input gear and a second gear meshed with the output gear having a pitch circle diameter different from that of the first gear; a planetary reduction mechanism of which one of three rotating elements is concentrically connected to the output gear and another one of the three rotating elements is connected to a wheel hub.

9 Claims, 4 Drawing Sheets

IN-WHEEL MOTOR POWERTRAIN

CROSS REFERENCE TO RELATED APPLICATION

The present application claims priority to Korean Patent Application No. 10-2018-0170327, filed Dec. 27, 2018, the entire contents of which is incorporated herein for all purposes by this reference.

BACKGROUND OF THE INVENTION

Field of the Invention

The present invention relates to an in-wheel motor powertrain and, more particularly, to a layout of the powertrain that may be applicable in various vehicles.

Description of the Related Art

Implementing driving force of a vehicle by an in-wheel motor powertrain may reduce the space occupied by the powertrain, and is particularly effective for implementing low-floor buses.

As described above, in order to realize the driving force of the vehicle by the in-wheel motor powertrain, the power generated by a motor must be reduced by a relatively large reduction ratio to be transmitted to driving wheels. In addition, the vehicle must have a compact configuration to ensure mountability to the vehicle.

The foregoing is intended merely to aid in the understanding of the background of the present invention, and is not intended to mean that the present invention falls within the purview of the related art that is already known to those skilled in the art.

SUMMARY OF THE INVENTION

The purpose of the present invention is to provide an in-wheel motor powertrain that has an effect of not only ensuring desired mountability to the vehicle with a relatively compact configuration to secure the loading space of commercial vehicles and the space of low-floor buses, but also realizing a sufficient reduction ratio and durability to secure sufficient driving force of the vehicle.

In order to achieve the objective of the present invention, there is an in-wheel motor powertrain including: an input gear directly connected to a motor; an output gear disposed in parallel to the input gear; an intermediate gear integrally and concentrically provided with a first gear meshed with the input gear, and a second gear meshed with the output gear having a pitch circle diameter different from that of the first gear; and a planetary reduction mechanism of which one of three rotating elements is concentrically connected to the output gear and another one of the three rotating elements is connected to a wheel hub.

The first gear constituting the intermediate gear may have the pitch circle diameter larger than that of the input gear, and the second gear may have the pitch circle diameter smaller than those of the first gear and the output gear.

The intermediate gear may be provided as one or more intermediate gears that are installed in parallel between the input gear and the output gear.

The planetary reduction mechanism may be a single-pinion simple planetary gear device including a sun gear connected concentrically to the output gear, a ring gear fixed to a housing, and a carrier connected to the wheel hub.

The housing may be provided to surround and support the input gear, the intermediate gear, and the output gear; the wheel hub may be rotatably supported on an outer circumferential surface of the housing; and the planetary reduction mechanism may be provided, while surrounding an end of the housing, on an opposite side of the output gear from the wheel hub.

A pump gear meshes with the input gear and a lubrication pump may be connected to the pump gear.

The output gear may be disposed on a first side of the input gear, the pump gear may be disposed on a second side of the input gear, and the intermediate gear may be disposed on a side of the input gear or the pump gear from the output gear.

The motor may be mounted on the housing at a position on an opposite side of the planetary reduction mechanism from the housing so that the motor may be separated from the housing and the input gear.

A rotation shaft of the motor passes through the housing and may be coupled to the input gear inside the housing by a spline.

The present invention has an effect of not only securing the mountability to the vehicle in a relatively compact configuration to obtain the loading space of commercial vehicles and the space of the low-floor buses, but also realizing a sufficient reduction ratio and durability, so as to secure sufficient driving force of the vehicle.

DETAILED DESCRIPTION OF THE INVENTION

Figure 1:
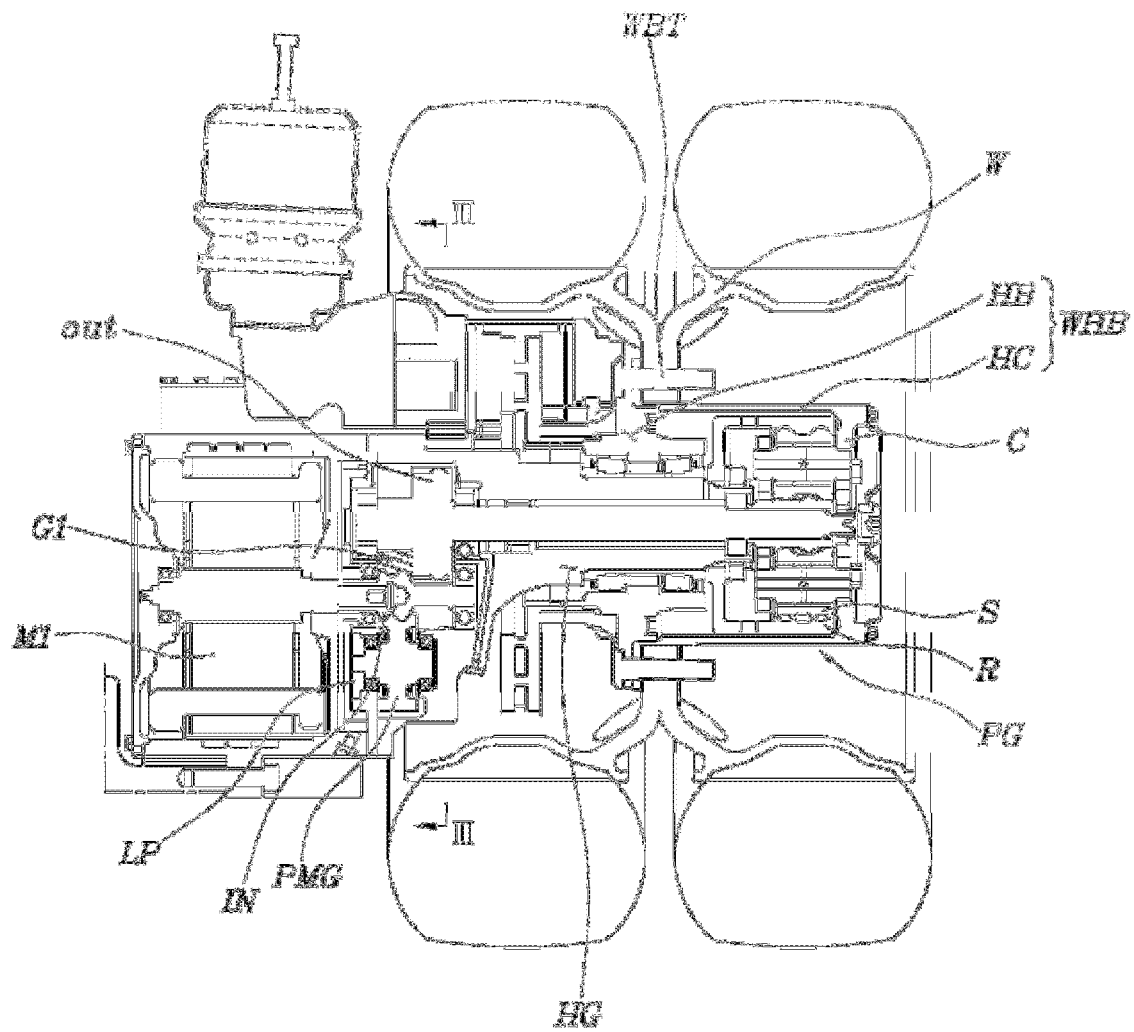
FIG. 1 is a block diagram of an in-wheel motor powertrain according to the present invention.
Figure 2:
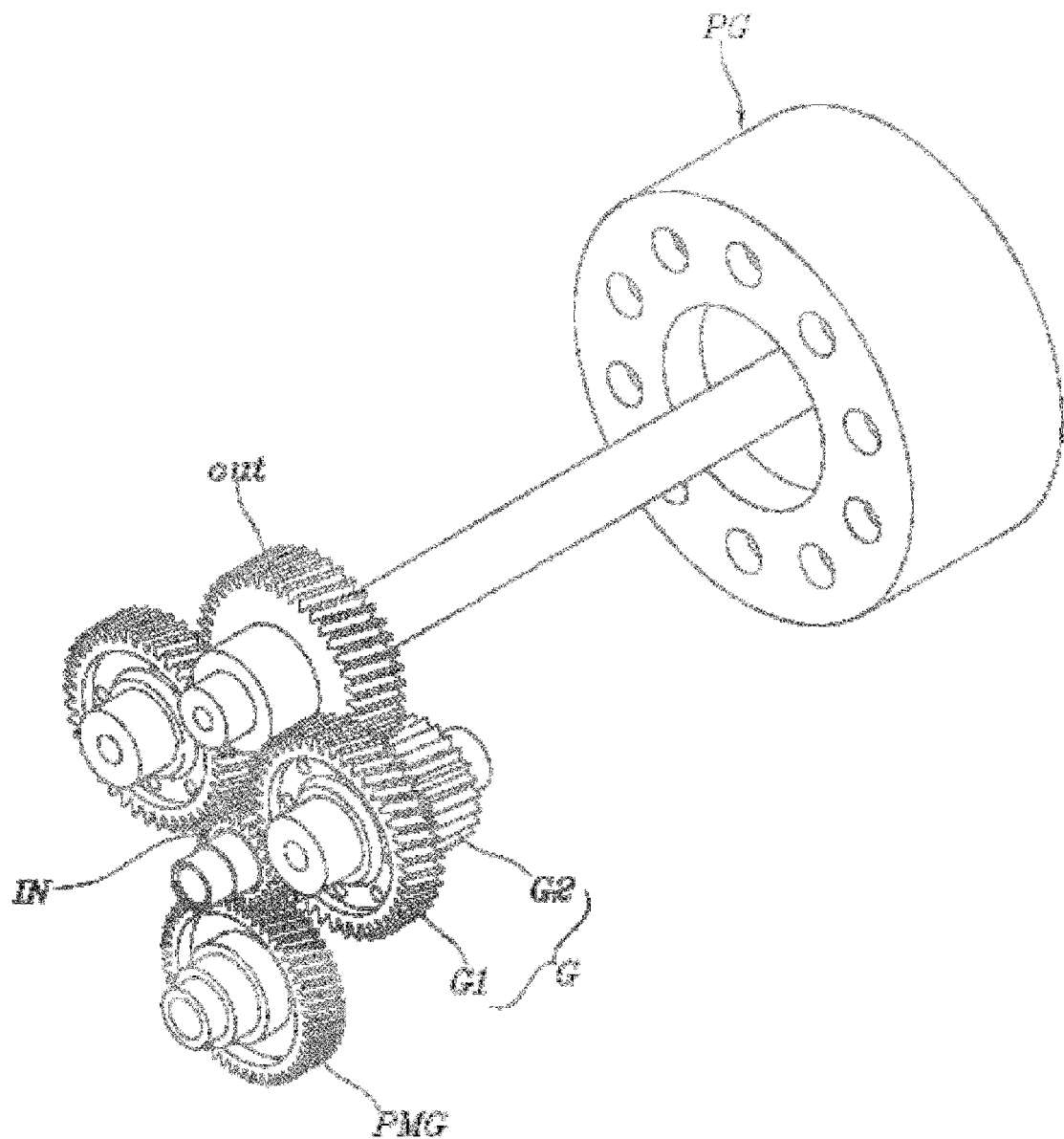
FIG. 2 is a perspective view of main components composing the powertrain of FIG. 1.

Referring to FIGS. 1 to 4, an exemplary embodiment of the in-wheel motor powertrain of the present invention includes an input gear IN directly connected to a motor M1, an output gear OUT disposed in parallel with the input gear IN, an intermediate gear G integrally provided with a concentric axis with both a first gear G1 meshed with the input gear IN and a second gear G2 meshed with the output gear OUT having a pitch circle diameter different from that of the first gear G1, and a planetary reduction mechanism PG in which one of three rotating elements is connected concentrically to the output gear OUT and another one of the three rotating element is connected to a wheel hub WHB.

The first gear G1 constituting the intermediate gear G has a pitch circle diameter larger than that of an input gear IN, and the second gear G2 has a smaller pitch circle diameter than those of the first gear G1 and the output gear OUT.

In other words, the present invention is composed of a triple reduction system in which after the first reduction is performed by the first gear G1 of the input gear IN and the intermediate gear G, secondary reduction is performed by the output gear OUT and the second gear G2 of the intermediate gear G, and the third reduction is performed again by the planetary reduction mechanism PG. Accordingly, the present invention realizes a high reduction ratio of 20:1 or more required, and thus a multi-stage reduction by multiple gears allows the gears to have sufficient durability to bear the load.

In particular, the intermediate gear G has a configuration in which two intermediate gears are provided in parallel between the input gear IN and the output gear OUT.

Therefore, the power transmitted from the motor M1 to the input gear IN has a power transmission flow in which after being distributed to the two intermediate gears G and reduced in speed, the power is joined again to the output gear OUT to be transmitted to the planetary reduction mechanism PG.

The planetary reduction mechanism PG is a single-pinion simple planetary gear device including a sun gear S concentrically connected to the output gear OUT, a ring gear R fixed to a housing HG, and a carrier C connected to the wheel hub WHB.

As described above, since the planetary reduction mechanism PG is configured by the planetary gear device having a relatively simple structure, the durability of planetary pinion composing the planetary gear device and the like may be sufficiently secured.

Since the ring gear R is fixed, the power input from the output gear OUT to the sun gear S of the planetary reduction mechanism PG is reduced in speed again through the carrier C, and then transmitted to the wheel hub WHB.

The housing HG is provided to surround and support the input gear IN, the intermediate gear G, and the output gear OUT, and the wheel hub WHB is rotatably supported on an outer circumferential surface of the housing HG. The planetary reduction mechanism PG has a compact configuration provided to surround the end of the housing HG on the opposite side of the output gear OUT from the wheel hub WHB.

The wheel hub WHB has a hub body HB rotatably supported on the outer circumferential surface of the housing HG, and a hub cover HC serving as the cover for the planetary gear device while serving as the carrier C of the planetary gear device. As shown, the hub body HB and the hub cover HC is configured to be integrated by the wheel bolt WBT with the wheel W.

Meanwhile, an opposite side of the housing HG is configured to be coupled to the motor M1 as shown, a rotating shaft of the motor M1 is configured to be coupled to the inside of the input gear IN by a spline so that the housing HG and the input gear IN may be easily assembled.

The sun gear S of the planetary reduction mechanism PG is also configured to be splined to an extension shaft extending from the output gear OUT, thereby providing easy-capability of combining the output gear OUT and the planetary reduction mechanism PG.

In addition, a pump gear PMG is meshed with the input gear IN, and a lubrication pump LP is connected to the pump gear PMG to pump oil required for lubrication of the gears.

Meanwhile, the output gear is disposed on a first side of the input gear, and the pump gear is disposed on a second side of the input gear. Also, a configuration may be provided such that the intermediate gear G is disposed on aside of the input gear IN or the pump gear PMG from the output gear OUT.

Figure 3:
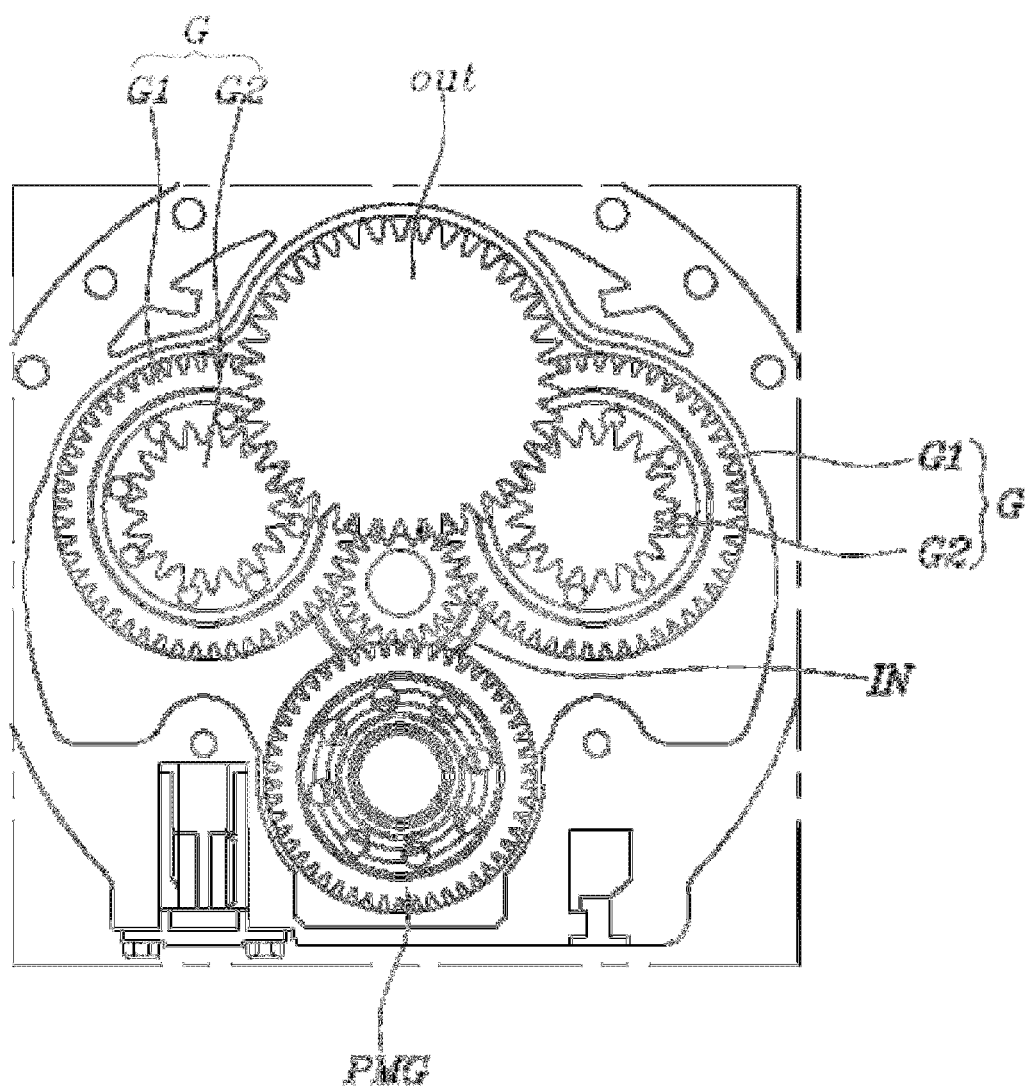
FIG. 3 is a view illustrating an arrangement of gears observed along the line III-III of FIG. 1.
Figure 4:
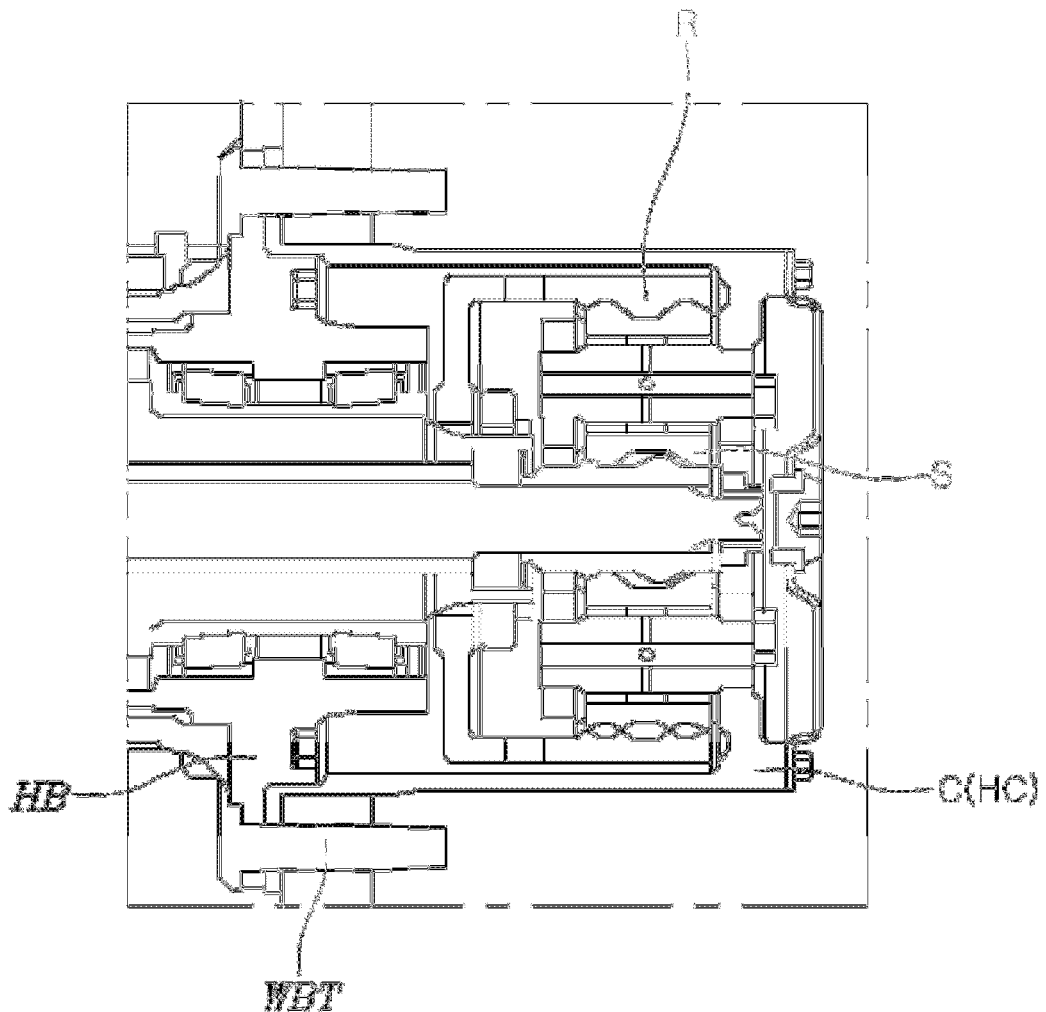
FIG. 4 is a detailed view of a portion of a planetary reduction mechanism of FIG. 1.

In the present exemplary embodiment, as shown in FIG. 3, the output gear OUT is disposed on the upper side of the input gear IN, the pump gear PMG is disposed on the lower side of the input gear IN, and the intermediate gears G are disposed on the left and right sides of the input gear IN.

This configuration provides layouts in which a shaft of the motor M1 coupled to the input gear IN and a shaft of the wheel hub WHB concentric with the output gear OUT and coupled to the wheel are offset from each other up and down. Accordingly, the motor M1 may be mounted at the lower side of the wheel W, thereby allowing the powertrain of the present invention to be mounted on an ultra-low floor bus or the like.

Meanwhile, the motor M1 is mounted on the housing HG at a position on an opposite side of the planetary reduction mechanism PG so that the motor M1 may be separated from the housing HG and the input gear IN.

In other words, a rotation shaft of the motor M1 passes through the housing HG and is coupled to the input gear IN inside the housing HG by the spline, and the case of the motor M1 is coupled to the housing HG by a fastening element such as a bolt or the like. Therefore, when loosening the fastening element, the motor M1 may be easily separated from the housing HG to replace the motor M1 with a new one.

As described above, when the motor M1 is configured to be easily separated from and coupled to the housing HG equipped with the input gear IN, the output gear OUT, and the like, it is easy for the powertrain to be configured with a variety of motor types, thereby having a significantly strong point such as in repair or maintenance of the motor.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An in-wheel motor powertrain comprising:
    an input gear directly connected to a motor;
    an output gear disposed in parallel to the input gear;
    at least one intermediate gear including a first gear and a second gear integrally and concentrically coupled to the first gear, the first gear being meshed with the input gear, and the second gear being meshed with the output gear having a pitch circle diameter different from that of the first gear; and
    a planetary reduction mechanism including three rotating elements,
    wherein one of the three rotating elements is concentrically connected to the output gear and another of the three rotating elements is connected to a wheel hub.

2. The in-wheel motor powertrain of claim 1, wherein the first gear has the pitch circle diameter larger than that of the input gear, and the second gear has the pitch circle diameter smaller than those of the first gear and the output gear.

3. The in-wheel motor powertrain of claim 2, wherein the at least one intermediate gear includes two or more intermediate gears that are installed in parallel between the input gear and the output gear.

4. The in-wheel motor powertrain of claim 1, wherein the planetary reduction mechanism is a single-pinion simple planetary gear device comprising a sun gear connected concentrically to the output gear, a ring gear fixed to a housing, and a carrier connected to the wheel hub.

5. The in-wheel motor powertrain of claim 4, wherein the housing is disposed to surround and support the input gear, the at least one intermediate gear, and the output gear, the wheel hub is rotatably supported on an outer circumferential surface of the housing, and the planetary reduction mechanism is positioned to surround an end of the housing on an opposite side of the output gear from the wheel hub.

6. The in-wheel motor powertrain of claim 1, wherein a pump gear meshes with the input gear and a lubrication pump is connected to the pump gear.

7. The in-wheel motor powertrain of claim 6, wherein the output gear is disposed on a first side of the input gear, the pump gear is disposed on a second side of the input gear, and the least one intermediate gear is disposed on a side of the input gear from the output gear.

8. The in-wheel motor powertrain of claim 5, wherein the motor is coupled to the housing at a position on an opposite side of the planetary reduction mechanism from the housing so that the motor is configured to be separated from the housing and the input gear.

9. The in-wheel motor powertrain of claim 7, wherein a rotation shaft of the motor passes through the housing and is coupled to the input gear inside the housing by a spline.

\* \* \* \* \*